United States Patent [19]

Ossian

[11] Patent Number: 4,640,852
[45] Date of Patent: Feb. 3, 1987

[54] MULTIPLE LAYER FILMS CONTAINING ORIENTED LAYERS OF NYLON AND ETHYLENE VINYL ALCOHOL COPOLYMER

[75] Inventor: William F. Ossian, Appleton, Wis.

[73] Assignee: American Can Company, Greenwich, Conn.

[21] Appl. No.: 675,519

[22] Filed: Nov. 28, 1984

[51] Int. Cl.⁴ .................... B65D 30/02; B32B 27/08
[52] U.S. Cl. .................... 428/35; 428/475.8; 428/476.1; 428/910; 428/349; 428/354
[58] Field of Search .............. 428/35, 475.5, 475.8, 428/476.1, 910, 349, 354; 206/484, 542.2, 484.2

[56] References Cited

U.S. PATENT DOCUMENTS

| | | | |
|---|---|---|---|
| 4,095,012 | 6/1978 | Schirmer | 428/476.1 |
| 4,241,130 | 12/1980 | Barnes | 428/475.8 |
| 4,405,667 | 9/1983 | Christensen et al. | 428/35 |
| 4,461,808 | 7/1984 | Mollison | 428/475.8 |
| 4,501,798 | 2/1985 | Koschak et al. | 428/475.8 |
| 4,552,801 | 11/1985 | Odorzynski et al. | 428/475.8 |

*Primary Examiner*—John E. Kittle
*Assistant Examiner*—James J. Seidleck
*Attorney, Agent, or Firm*—Stuart S. Bowie; Thomas D. Wilhelm; Paul R. Audet

[57] ABSTRACT

A multiple layer sheet structure has oriented layers of nylon and EVOH. Additional layers may or may not be utilized, and may or may not be oriented. Where additional layers are used, one of the additional layers, on the exterior surface of the structure, is preferably heat sealable. The structure shows improved impact resistance, after retort processing, over similar structures not having oriented nylon and EVOH layers. In certain embodiments, retort processed pouches made from the packaging structures have improved stress crack resistance when dropped onto a hard surface.

15 Claims, 6 Drawing Figures

MULTIPLE LAYER FILMS CONTAINING ORIENTED LAYERS OF NYLON AND ETHYLENE VINYL ALCOHOL COPOLYMER

BACKGROUND OF THE INVENTION

Heat sealed pouches made from flexible sheet stock are now being used for packaging certain products and sterilizing them in the package. The packaged product may then be stored without refrigeration. Typical products packaged and used in this manner are certain foods and medical supplies. The packaging thus used is known generally as a retort pouch.

The first generation of retort pouches included certain reactive adhesive compositions, used for adhering the various layers to each other. In subsequent developments, the reactive adhesives were eliminated because of possible extractive contaminants, and retort pouch structures are now made by various methods of adhering the layers to each other by one or more of several extrusion and/or lamination processes. Due to recently developed adhesive compositions, adhesive lamination is again a viable laminating process. Illustrative of the extrusive-type processes is one taught in U.S. Pat. No. 4,190,477. In the process described in that patent, biaxially oriented polyester is first adhesively mounted to metal foil on what is to be the outside of the package. A polypropylene-based heat sealing layer is separately extruded. A primer is applied to the side of the foil opposite the polyester. Finally the sealant layer and the primed foil are extrusion laminated together using an extrusion grade polypropylene-based polymer as the extrusion laminant.

Another retortable structure, and not including metal foil, is disclosed in U.S. Pat. No. 4,405,667. In that teaching the outer layers of the contemplated pouch include a nylon/EVOH/nylon/ sub-structure, where EVOH is ethylene vinyl alcohol copolymer.

Non-foil retortable sheet structures have a number of potentially attractive advantages. Foil is the only component of known foil-containing structures that prevents microwave energy from penetrating the package. Thus, elimination of the foil layer gives the structure additional functional utility as for cooking with microwave appliances. There is also the functional potential for transparency of the pouch, as for visual inspection of the contents.

Non-foil structures have substantial potential for cost advantages. The foil material, itself, is costly. Also, the processes for making non-foil structures are potentially less expensive. As multiple layer coextrusion technology continues to develop, the cost of making increasingly complex polymeric structures is continuing to decline. As a result, a significant advantage for the non-foil structures is that the number of processing steps is usually less for construction of a non-foil pouch structure than for construction of a foil-based structure having generally comparable functional characteristics. Thus the potential for cost-competitiveness generally favors non-foil structures.

Common to the requirements of retort pouch packaging is the requirement that the filled and sealed package be subjected to sterilizing conditions of relatively high temperature after the pouch is filled with product and sealed. Typical sterilizing conditions are on the order of 250° F. to 260° F. and may range in severity up to about 275° F. with residence times at sterilizing conditions of as much as 30 minutes or more. Such conditions impose severe stresses on the packages. Many packaging structures provide excellent protection for the package contents at less severe conditions. For example, relatively simple packaging structures for packaging requiring the ability to withstand boiling water, such as at 212° F. are readily available from several suppliers. However, such relatively simple packaging structures are not capable of surviving the higher temperatures of retort processing, and the subsequent handling while they are still hot. For satisfactory performance in a retortable package, the structure must not delaminate, shrink, or wrinkle, or otherwise be adversely affected by the retort processing. Oxygen and water barrier properties are typically required of retortable packaging structures. These barrier properties must not be permanently adversely affected by the retort processing and attendant handling of the packages. And finally the structure must be adequately strong to permit handling of the package while still hot.

Each of the several layers of the sheet or film structure serves particular purposes and must satisfy particular requirements. The following description of requirements and preferred materials begins with the interior barrier layer.

The barrier layer provides a sufficient barrier to oxygen to provide adequate shelf-life, dependent on the oxygen sensitivity of the product in the package. EVOH provides superior oxygen impermeability when compared with other polymeric materials such as saran and acrylonitrile which have been employed in packages for oxygen barrier qualities. A very thin layer of EVOH will provide an adequate barrier to oxygen. And while EVOH is very expensive compared to an equal quantity of saran or acrylonitrile, the quantity of EVOH required is substantially less. Thus the cost of an EVOH barrier layer is competitive with saran and acrylonitrile because less EVOH is used in a barrier layer than is used in an equivalent layer of saran or acrylonitrile.

The oxygen barrier quality of EVOH is adversely affected by the presence of water in the EVOH layer. A small quantity of water will raise the moisture content of a thin layer of EVOH to an extent where the oxygen barrier quality of the layer is severly affected. The oxygen barrier quality of EVOH is restored when the moisture is removed.

Polyolefins such as polyethylene, polypropylene, and blends and copolymers of the two are considered to be excellent moisture barriers. Polyolefins are heat sealable. High density polyethylene, polypropylene, and blends and copolymers of polypropylene and polyethylene melt at temperatures sufficiently high to provide heat seals which survive hot filling at temperatures in the neighborhood of 190° F. or retorting at up to about 275° F., yet seal at temperatures between 350° F. and 400° F. which are attainable with existing heat seal equipment at normal sealing pressures and time. Consequently, high melting temperature polyolefins are suitable for use as the inside heat seal layer of a retortable pouch. However, the permeability of polyolefins to water is greatly increased at the elevated temperatures encountered in commercial retort-type sterilization. Thus, a polyolefin layer may permit intrusion of water into the EVOH oxygen barrier layer during hot filling or retorting. Since polyolefins again become relatively impermeable to water upon cooling, moisture in the EVOH layer cannot escape through the polyolefin layer. Thus, the layer or layers which are on the outside of the package from the EVOH layer should desirably be relatively permeable to moisture under normal storage conditions to permit escape of any moisture which may be in the EVOH layer.

A suitable polymeric material for the package outside layer is nylon. Nylon is sufficiently permeable to moisture to permit the escape of moisture from the EVOH layer to restore the oxygen barrier quality, yet is sufficiently waterproof to permit accidental wetting of the package without harm to the oxygen barrier property of the EVOH layer. Nylon is tough, flexible, not greatly affected by heat or cold. It is abrasion resistant, transparent, and can be printed upon for label purposes. Nylon is not excessively expensive and has adequate adhesion to EVOH. Nylon can be coextruded with EVOH and with polyolefins. Thus, nylon has several attributes which are desirable in a multiple layer film where the nylon is an outside surface layer, overlying an EVOH barrier layer.

Some structures containing nylon, however, have exhibited a particular problem with embrittlement of the nylon and the EVOH during the retort processing. While these structures may have good utility before retort processing, they do not have satisfactory toughness and abuse resistance after having been subjected to retort processing. While the magnitude of the problem may be somewhat reduced by careful compounding of polymer and additives, it would be desirable to resolve the problem while retaining as much freedom as possible in the compounding of the structural layers.

It is an object of this invention to provide a multiple layer sheet structure containing adjacent nylon and EVOH layers wherein the nylon and EVOH may be characterized by their toughness after retort processing.

It is another object of this invention to provide a multiple layer sheet structure containing adjacent nylon and EVOH layers wherein the nylon and EVOH layers may be characterized by their resistance to impact after exposure to retort processing conditions.

It is a further object to provide a multiple layer non-foil sheet structure suitable for making retortable pouches, the sheet structure containing nylon and EVOH layers and wherein the nylon and EVOH retain their toughness and flexibility, without stress cracking, after exposure to retort processing conditions.

Further objects of the invention are found in methods of making retortable sheet structures containing nylon and EVOH, and wherein the nylon and EVOH substantially retain their respective properties of toughness and flex crack resistance.

SUMMARY OF THE INVENTION

As a result of extensive research by the inventor into layer compositions and methods of forming and processing polymers, it has now been found that multiple layer sheet structures containing adjacent nylon and EVOH layers may be retort processed without the undesirable embrittlement. In the structures, the layers are firmly adhered to each other in face to face contact.

The invention, in its simplest form, is a two layer sheet structure of nylon and EVOH layers firmly adhered to each other, and wherein both layers are molecularly oriented to impart to them the special capability of retaining their toughness and flexibility after retort processing.

An easily produced 3-layer structure of the invention is one having a core layer of EVOH, with a layer of nylon on each of its surfaces, and wherein the three layers are oriented to impart to them the special capability of retaining their toughness and flexibility after retort processing.

Retortable pouch structures using films of the invention may utilize five primary layers. A representative structure comprises, in order, a first layer of nylon, a second layer of ethylene vinyl alcohol copolymer, a third layer of nylon, a fourth layer of an anhydride modified polyolefin, and a fifth layer of a heat sealable olefinic polymer or copolymer. At least the recited first through third layers are molecularly oriented. In a preferred structure, there is a sixth layer of a polymeric adhesive adhering a seventh olefinic heat seal layer to the fifth layer. The preferred predominant polymer of the composition of the seventh layer is selected from the group consisting of linear low density polyethylene (LLDPE), propylene ethylene copolymer (PPE), and blends of LLDPE and PPE.

The invention is further illustrated by a method of making a finished multiple layer film. The first step is formation of a multiple layer film precursor which contains the nylon and EVOH compositional layers contemplated to be present in the finished film. The formation in the first step is preferably accomplished by coextrusion.

Secondly, the multiple layer film precursor formed in the first step is molecularly oriented.

Depending on the polymeric compositions and layer structure of the precursor film formed in step one, further processing may or may not be required beyond the second step. When a functional heat sealable layer has been incorporated into the film as formed in step one, then the film may be in finished form and ready for direct use in making heat sealable packages after the orientation of step two. For some applications, the addition of a separate heat sealable layer is desirable. In those applications, step three is the formation of a separate heat sealable polymeric film layer, preferably by extrusive process. The separate film layer, when adhered to the fifth layer, is capable of being activated and heat sealed.

Fourth is the step of adhering the separate polymeric film layer to the fifth layer. The preferred process for effecting that adhesion is by extrusion laminating the separate polymeric film to the fifth layer.

DETAILED DESCRIPTION OF THIS INVENTION

Figure 1:
FIG. 1 shows a cross section of a simple 2-layer sheet structure of this invention.

Referring now to the drawings, the overall structure in FIG. 1 is indicated by the numeral 110. Layer 112 is nylon. Layer 114 is EVOH.

Figure 2:
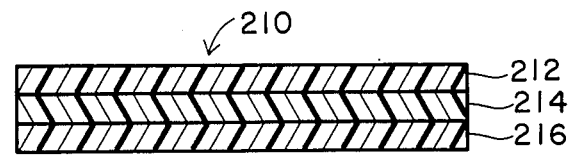
FIG. 2 shows a cross section of a typical 3-layer sheet structure of this invention.

In FIG. 2, the overall structure is 210. Layers 212 and 216 are nylon. Layer 214 is EVOH.

Figure 3:
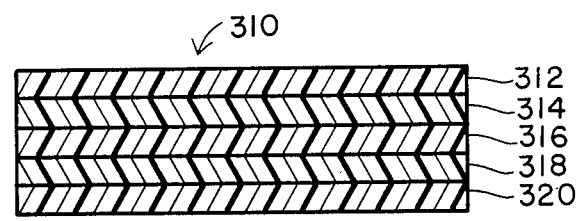
FIG. 3 shows a cross section of a typical 5-layer sheet structure of this invention.

In FIG. 3, the overall structure is 310. Layers 312 and 316 are nylon. Layer 314 is EVOH. Layer 320 is the sealing layer, which is preferrably susceptible of coextrusion with the rest of the structure. Layer 318 is an adhesive which is effective to join layers 316 and 320 with good interfacial adhesion.

Figure 4:
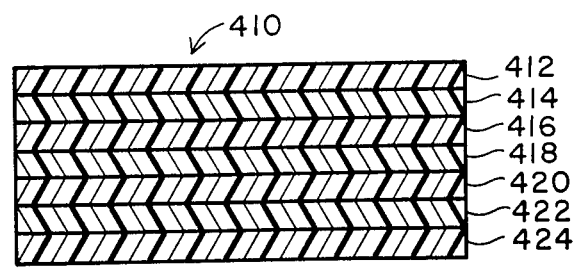
FIG. 4 shows a cross section of a typical 7-layer sheet structure of this invention.

In FIG. 4, the overall structure is 410. Layers 412 and 416 are nylon. Layer 414 is EVOH. Layer 418 is an adhesive which is effective to join layers 416 and 420 with good interfacial adhesion. Layer 420 is similar to layer 320, but since it is not the outer layer in the FIG. 4 structure, it need not have specific heat sealing properties as required of layer 320.

Layer 424 is the sealing layer and thus normally provides heat sealing properties. Layer 422 is primarily an adhesive layer to join layers 420 and 424. The compositions of layers 420, 422, and 424 may be chosen individually within certain functional limitations. Layer 424 should be heat sealable. Layer 420 desirably is coextrudable with layers 412, 414, 416, and 418. Layer 422 is effective as an adhesive for joining layers 420 and 424.

Referring now to FIGS. 1-4, it is seen that, in the numbering system used, the first digit identifies the figure number and the second and third digits identify the particular element in the figure. Common second and third digits are used on the several figures to denote similar layers. Hereinafter, only the second and third digits are used when referring to a property which is common to an element in all the figures where it is used. When referring to an element in a specific figure, all three digits are used. Thus the number 14 refers to the EVOH layer in any and all of FIGS. 1-4; whereas the number 314 refers only to the EVOH layer which is in FIG. 3.

It is seen that the basic function of the invention is embodied in a special film having oriented layers of nylon and EVOH. The characteristics of the special film are such that, after the film has been subjected to retort processing, it has substantially better resistance to failure due to an impact shock than an essentially identical film where the nylon and EVOH layers are not oriented.

Generally speaking, the nylon in layers 12 and 16 may be any of the nylons or blends of nylons. Minor amounts of polymers and additives compatible with nylon may be included. For those applications where the sheet material will be subjected to only moderate temperatures up to about 220° F., any of the nylons have adequate heat stability, and criteria other than heat tolerance may be used to select the most desirable nylon compositions.

For those applications where the sheet material will be subjected to retort-type temperatures, such as up to 275° F., the selection of acceptable nylon polymers is somewhat more limited, as not all nylons are capable of withstanding the process conditions. Nylons known to be acceptable for use under retort conditions are nylon 6, nylon 66, nylon 6/66 copolymer, nylon 11, and blends of nylon 6 and nylon 11. Nylon 12 may be used in blend composition up to 25% by weight.

Where more than one layer of nylon is used, as in the structures of FIG. 2-4, it is possible that the compositions of the nylon layers may not be the same. In typical structures, however, multiple nylon layers as at 12 and 16 do have the same composition.

Layer 14, of EVOH, is known to serve as a barrier to oxygen transmission in low and moderate humidity environments. The layer 14 composition may advantageously include up to about 25% of plasticizer therefore. In films which will not be subjected to conditions as of retort processing, the plasticizer may be left out. For films which will be subjected to conditions as of retort processing, the plasticizer is included in an amount which is effective to provide for functional orientation of the EVOH in the multiple layer film. Functional orientation includes the concept of the film being heat set, also known as annealed.

It is important that all the layers of the film retain their oriented shape and form after retort processing. Structures made without the use of plasticizer in the EVOH layer exhibit poor shape retention, and delamination, after retorting, and so are not specified for retort end uses.

Incorporation of plasticizers in amounts as small as 10% by weight of the EVOH layer provides for a superior retort pouch structure. As little as 5% plasticizer provides some improvement in delamination resistance and shape retention; thus 5% is generally the lower limit of plasticizer addition for the EVOH layer. 10% plasticizer is a preferred lower range of addition for excellent sheet structures. Generally more than 25% plasticizer does not provide further improvement in functional properties, so this is considered a practical upper limit. Highly satisfactory plasticizers are nylon 6, nylon 6/66 copolymer and polyetheramide block copolymer. Another satisfactory plasticizer is a blend of nylon 6 or nylon 6/66 with α-olefinic polymer, wherein the α-olefinic polymer may contain carboxyl groupings.

Layer 20, as at 320 in FIG. 3, is preferably a heat sealable polymer. It is also preferably susceptible of coextrusion with the rest of the structure as at 310. A highly satisfactory, and preferred composition for layer 20 is polypropylene copolymer, preferrably containing 2-8% ethylene. Another preferred composition for layer 20 includes linear low density polyethylene. Blends of PPE and LLDPE are also acceptable.

Where layer 20 is not on the exterior surface of the film, as at 420 in FIG. 4, it need not possess a heat sealing capability. In such a structure, it serves, rather, as a surface suitable for affixing another layer thereto.

Layer 18 is an adhesive and preferrably a polymer, which is effective to join layers 16 and 20 with good interfacial adhesion. Highly satisfactory polymers for use in combination when layer 20 is PPE are anhydride modified polypropylenes sold as QF-500 and QF-500X by Mitsui Company, Japan. For use with a layer 20 composition of LLDPE, the layer 18 composition is more desirably an anhydride modified polyethylene or ethylene copolymer. Exemplary of these polymers are NF-500 sold by Mitusi, CXA polymers sold by DuPont, and Plexar polymers sold by Chemplex Company.

The specific compositions of layers 18 and 20 are not critical. What is important is their functional characteristics.

Layer 18 must serve as an effective adhesive between layers 16 and 20. Layer 20 serves either as a heat sealing layer as in FIG. 3 or as a mounting surface to which other layers are adhered as in FIG. 4. For retort applications, all the layers must, of course, be able to withstand retort processing conditions, particularly without excessive softening or weakening of the inter-layer adhesion. Given those requirements, skilled artisans can devise a variety of acceptable compositions for layers 18 and 20.

In a desirable process for making the structures of FIGS. 1-4, layers 12, 14, 16, 18, and 20, as they apply, are coextruded and molecularly oriented, followed by heat setting at a temperature at least 2° F., and preferably 5° F. above the orientation temperature. For retort applications, the heat setting temperature may be up to 280° F. or more. Layers 422 and 424 may subsequently be added either by extrusion lamination, coextrusion coating, or other conventional process for adding layers.

Figure 6:
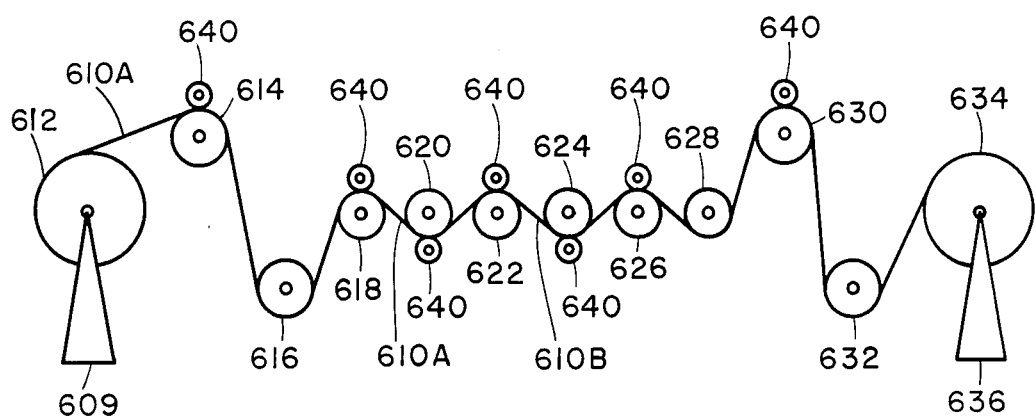
FIG. 6 is an outline of a representative line of processing equipment for carrying out orientation performed on films of this invention.

A desirable process for orienting films of this invention is descriptively illustrated in combination with the outline of processing equipment shown in FIG. 6.

A roll 612 of the film to be oriented 610A is seen on unwind stand 609. The film is unwound and passes over preheating rolls 614, 616, 618, and 620. Rolls 640 form speed-controlling nips at several of the processing rolls, and assist in restraining and controlling the speed of advance of the film through the orientation equipment. Stretch orientation is accomplished between rolls 620 and 622 by driving roll 622 at a speed differential, compared to the speed of roll 620, which forces the film to stretch by the desired ratio. Using equipment such as is shown in FIG. 6, orientation ratios of 2/1 to 3.5/1 are preferred. Rolls 622, 624, 626, and 628 essentially maintain the line speed and the temperature of the film. Roll 630 is maintained at a temperature high enough to set the molecular orientation at a temperature above the maximum temperature which the film is expected to encounter during its useful life. For use in retort pouches which are expected to encounter temperatures up to 275° F. during their useful life, for example, the film may be heat set on roll 630 at 280° F. The film is then cooled on roll 632 and is finally wound up on roll 634 at wind-up stand 636.

Since the improved properties of the films of the invention are seen to be embodied primarily in the nylon and EVOH layers in their molecularly oriented form, the oriented form of the nylon and EVOH layers is critical to the invention. Layers 18 and 20 may or may not be oriented and may even be formed separately from the rest of the structure. In constructing such a film, layers 12, 14, and 16 are preferrably coextruded as a first operation and are oriented as a second operation. Layers 18 and 20 are then added to the three-layer structure. In a preferred process for adding layers 18 and 20, layer 20 is formed separately as a single layer film. It is subsequently extrusion laminated to layer 16 using layer 18 as the extrusion laminant. Other methods of applying layers 18 and 20 include coextrusion coating, and coextrusion followed by heat and pressure lamination at a hot nip. In another method of completing the five layer structure, layer 20 is separately formed as by extrusion and it is then laminated to layer 16 by use of a laminating adhesive as layer 18. A suitable adhesive, which also has FDA approval for food packaging, is Morton Adcote 506/9L10, an adhesive having aliphatic isocyanate crosslinking agents. The specific method of applying layer 18 and 20 is not critical so long as sufficient interlayer adhesion is achieved.

The addition of layers 422 and 424 is optional, depending on the physical and performance characteristics embodied in layer 20 as regards functioning as the outer layer of the film. In numerous applications, and particularly in retort pouch applications, it is desirable to have a finished film of the order of 5 mils thickness, with a substantial portion of the thickness being the heat seal layer, which need not be oriented. To orient a film to this thickness at the orientation ratios contemplated herein above, it is seen that the unoriented film must be of the order of 10 to 18 mils thick. Such a film is difficult to handle in known orientation processes. Since no packaging product performance benefit is seen in orienting the heat seal layer, whether in a five layer film as in FIG. 3, or in a seven layer film as in FIG. 4, it is usually preferred to form a heat seal layer substructure separately from the layers which are to be oriented. After orientation, then, the oriented substructure is joined to the heat seal layer substructure to form the finished heat sealable multiple layer sheet structure.

Sheet structures of the invention having heat seal layers may be formed into a retortable pouch by joining facing portions of the sheet material with the sealable layer on the facing surfaces thereof and forming heat seals in known manner about the periphery of the contiguous portions. The portions may be separate sheets, or may comprise a sheet which has been folded over onto itself with the sealant layer on the inside of the fold.

The coextrusion of the three layer structure
/nylon/EVOH/nylon/
is readily accomplished. This three layer structure may be combined, before or after orientation, with other layers to form a variety of more complex structures, in addition to the specific retortable structures described herein. Thus in a simple form, the invention may be considered as a combination of oriented layers of nylon and EVOH. The most readily formed combination is the oriented three-layer combination seen in FIG. 2. The simplest structural version of the invention is the oriented two-layer structure of FIG. 1.

EXAMPLE 1

A 5 mil, 5 layer film was coextruded, the film having the structure;
/nylon/EVOH/nylon/Admer/PPE/
The nylon layers were a blend of 75% nylon 6 and 25% nylon 12. The EVOH layer was a blend of 75% GL-DE from Nippon Gohsei and 25% of a polyethylene modified with carboxyl groups. The polyethylene also contained about 25% nylon 6 in blend composition. Admer was anhydride modified polypropylene. PPE was propylene ethylene copolymer containing 4.5% ethylene.

The coextruded film was uniaxially oriented at an orientation ratio of 3.5/1, and heat set at 252° F., yielding a film 1.4 mils thick.

EXAMPLE 2

A 7 mil, 5 layer film, having the same general layer structuring as in EXAMPLE 1 was coextruded and oriented as in EXAMPLE 1.

EXAMPLE 3

A 5 mil, 5 layer film was made and oriented as in EXAMPLE 1, and having alternate layer ratios, shown below.

EXAMPLE 4

A 5 mil, 5 layer film was made and oriented as in EXAMPLE 1. The layer compositions were the same as in EXAMPLE 1 except that the EVOH layer was 90% GL-DE EVOH and 10% nylon 6/66 copolymer as a plasticizer.

EXAMPLE 5

A 5 mil, 5 layer film was made and oriented as in EXAMPLE 1. The layer compositions were the same as in EXAMPLE 1 except that the EVOH layer was 80% GL-DE EVOH and 20% nylon 6/66 copolymer as a plasticizer.

EXAMPLE 6

A 5 mil, 5 layer film was made and oriented as in EXAMPLE 1. The layer compositions were the same as in EXAMPLE 1 except that the EVOH layer was 100% GL-DE, and did not include plasticizer.

EXAMPLE 7

As a control to the experiments in EXAMPLES 1-6, a 5 mil film was coextruded, but not oriented, and tested along with the oriented films of the invention. The control film had the structure:
/nylon/EVOH/nylon/Admer/PPE/
The layer compositions were identical to the compositions of the corresponding layers in EXAMPLE 1.

All the films in EXAMPLES 1-6 were successfully oriented. The film of EXAMPLE 2, at 7 mils, was the thickest film oriented. Moderate problems were experienced trimming its edge because of its greater thickness. Film of EXAMPLE 3 did have a few holes after orienting, but much of the film was of satisfactory, usable, quality. Film of EXAMPLES 4 and 5 had some surging. Film of EXAMPLE 6 oriented best of all the EXAMPLES.

Each of the 5 layer oriented films in EXAMPLES 1-6 was extrusion laminated, at the PPE layer, with three mils of propylene ethylene copolymer, using 0.5 mil of propylene ethylene copolymer as the laminant. The resulting packaging structure was about 5 mils thick for EXAMPLES 1, 3, 4, 5 and 6 and about 5.5 mils for EXAMPLE 2.

The packaging films so made and the film of COMPARATIVE EXAMPLE 7 then had approximately the layer thicknesses shown in Table 1.

TABLE 1

| Ex. No. | Layer Thickness, mils | | | | | Total Film Thickness, mils |
|---|---|---|---|---|---|---|
| | Nylon | EVOH | Nylon | Admer | PPE[1]+ PPE[2]+ PPE[3] | |
| 1 | .24 | .31 | .24 | .34 | 3.78 | 4.91 |
| 2 | .32 | .36 | .32 | .58 | 3.94 | 5.52 |
| 3 | .24 | .32 | .24 | .32 | 3.78 | 4.90 |
| 4 | .24 | .31 | .24 | .35 | 3.77 | 4.91 |
| 5 | .22 | .34 | .18 | .34 | 3.75 | 4.83 |
| 6 | .22 | .31 | .20 | .45 | 3.72 | 4.90 |
| 7 (Comparative) | .25 | .50 | .25 | .50 | 3.50[4] | 5.00 |

Figure 5:
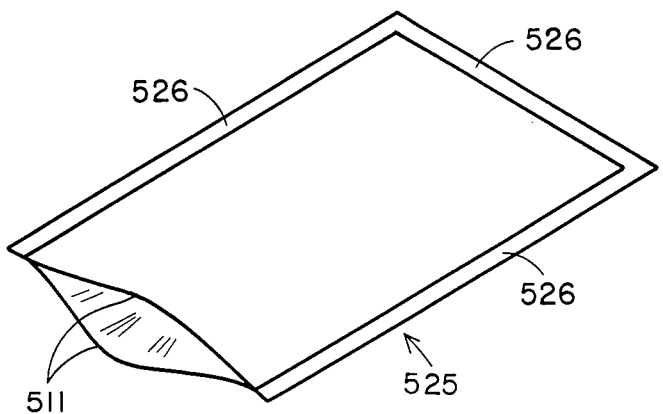
FIG. 5 shows a pictorial view of a typical pouch made from sheet structure of this invention.

[1]From oriented film
[2]Extrusion laminant layer
[3]3-mil sealant layer
[4]From coextruded film only The multiple layer packaging structures from all seven EXAMPLES were used to make heat sealed pouches such as is shown in FIG. 5 with the exterior PPE layer in the packaging structure being positioned on the interior of the pouch as the heat sealing layer. The pouches were filled with water and heat sealed closed. The pouches were retort processed at 250° F. for 30 minutes and cooled for 20 minutes. The processed pouches were observed for visual changes. Pouches of EXAMPLES 1-3 were intact and fully functional, though they showed minor fraying of film edges, confined to the sealed edge portions as at 526 in FIG. 5. Pouches of EXAMPLES 4 and 5 showed no ill effects from the retort processing. Film of the pouches from EXAMPLE 6 had a rippled appearance, suggesting that one or more of the layers may have shrunk during the retort processing. There was also significant delamination in the film from EXAMPLE 6. Pouches from COMPARATIVE EXAMPLE 7 were white.

The pouches were then placed in a hot, dry environment of 100° F., 20% relative humidity for 24 hours and observed again. Pouches of EXAMPLES 1 and 2 showed a little more fraying of the edges, but the fraying was still confined to the seal area, and the pouches were functionally usable. Pouches of EXAMPLES 3-5 were excellent, the same as before. Pouches of EXAMPLE 6 showed increased delamination, severe creep, and a brittle surface, these problems being severe enough to preclude successful use of EXAMPLE 6 material for retort pouches, though the pouches were entirely satisfactory if not retorted. The pouches of COMPARATIVE EXAMPLE 7 were partially clear and still partially white.

The processed pouches were then tested in two ways for abuse resistance. In the first test, the pouches were dropped onto a hard surface from a height of 60 inches. The pouches from EXAMPLES 1-5 showed no ill effects, either by visual inspection or by laboratory analysis, after repeated drops.

The pouches from COMPARATIVE EXAMPLE 7 showed no immediate ill effect from the drop, but within 15 seconds after the first drop, tiny cracks began to appear and propagate, in each pouch dropped. Laboratory analysis of the packaging structure showed that the cracks were occuring in the nylon and EVOH layers. Also oxygen permeability was substantially higher than in the pouches of EXAMPLES 1-6, further indicating failure in the EVOH layer.

In the second test, the processed pouches were cut apart and the packaging structure was tested for impact strength according to ASTM 3420-75, in which a hard object is impacted onto the structure and penetrates it. The energy absorbed by the sheet structure is reported as impact strength in centimeters-kilogram of force. The strengths of the retorted sheet structure of the examples are shown in Table 2.

TABLE 2

| Example No. | Impact strength cm.-kg. | | Type of Break |
|---|---|---|---|
| | Average | Range | |
| 1 | 3.5 | 2.5-5.0 | split |
| 2 | 5.5 | 3.0-10.0 | split |
| 3 | 7.2 | 4.0-10.0 | split |
| 4 | 6.9 | 2.0-10.0 | split |
| 5 | 8.1 | 5.0-10.0 | split |
| 6 | 4.6 | 3.0-9.0 | split |
| 7 (Comparative) | 1.8 | 1.0-3.0 | star, shatter-type break |

The type of break caused in the ASTM test is indicative of relative brittleness/toughness of the film material. The star, shatter-type break in films of COMPARATIVE EXAMPLE 7 is indicative of a brittle film. The spit type breaks in the films of EXAMPLES 1-6 indicate greater toughness of the film. In addition, the films of the invention, namely those of EXAMPLES 1-6, were all substantially better than the films of the COMPARATIVE EXAMPLE, having higher strength whether measured by the average reading or the range of the readings. Thus it is seen that the invention provides sheet structure containing adjacent nylon and EVOH layers wherein the nylon and EVOH layers may be characterized by their resistance to impact after exposure to retort processing conditions. The impact strength in the ASTM test is substantially better than that of films not using oriented layers.

The invention also provides multiple layer non-foil sheet structure suitable for making retortable pouches. The sheet structure contains nylon and EVOH layers. The nylon and EVOH retain their toughness and flexibility, without stress cracking, after exposure to retort processing conditions. The impact strength in the ASTM test is substantially better than that of films not using oriented layers.

The invention further provides methods of making retortable sheet structures containing nylon and EVOH, wherein the nylon and EVOH substantially retain their respective properties of toughness and flex crack resistance.

I claim:

1. A multiple layer oriented sheet structure wherein the layers are firmly adhered to each other, said sheet structure comprising a first oriented layer of nylon, and in face to face contact with said first layer, a second oriented layer of ethylene vinyl alcohol copolymer, said second layer containing an effective amount of a plasticizer therefore, said sheet structure being capable of withstanding retort conditions for 30 minutes at 250° F. without substantial embrittlement of said layers.

2. A multiple layer oriented sheet structure wherein the layers are firmly adhered to each other, said sheet structure comprising a first oriented layer of nylon, and in face to face contact with said first layer, a second oriented layer of ethylene vinyl alcohol copolymer, and a third oriented layer of nylon in face to face contact with said second layer of ethylene vinyl alcohol copolymer, said structure thus comprising a layer of ethylene vinyl alcohol copolymer with a layer of nylon on each of the surfaces thereof, said second layer containing an effective amount of a plasticizer therefore, said sheet structure being capable of withstanding retort conditions for 30 minutes at 250° F. without substantial embrittlement of said layers.

3. A multiple layer flexible packaging sheet structure wherein the layers are firmly adhered to each other in face to face contact, said sheet structure comprising in order:
    (a) a first oriented layer of nylon;
    (b) a second oriented layer of ethylene vinyl alcohol copolymer;
    (c) a third oriented layer of nylon;
    (d) a fourth adhesive layer; and
    (e) a fifth layer of a heat sealable olefinic polymer; at least said recited first, second, and third layers being molecularly oriented, said second layer containing an effective amount of a plasticizer therefore, said sheet structure being capable of withstanding retort conditions for 30 minutes at 250° F. without substantial embrittlement.

4. A multiple layer sheet structure as in claim 3 and including a sixth layer of an adhesive adhering a seventh olefinic heat seal layer to said fifth layer.

5. A multiple layer sheet structure as in claim 4 wherein said fourth and sixth layers are polymeric.

6. A multiple layer sheet structure as in claim 4 wherein the predominant polymer of the composition of said seventh layer is selected from the group consisting of linear low density polyethylene copolymer, propylene ethylene copolymer, and blends of linear low density polyethylene copolymer and propylene ethylene copolymer.

7. A multiple layer sheet structure as in claim 5 wherein the predominant polymer of the composition of said seventh layer is selected from the group consisting of linear low density polyethylene copolymer, propylene ethylene copolymer, and blends of linear low density polyethylene copolymer and propylene ethylene copolymer.

8. A retortable pouch made from the packaging sheet structure of claim 3.

9. A retortable pouch made from the packaging sheet structure of claim 4.

10. A retortable pouch made from the packaging sheet structure of claim 5.

11. A retortable pouch made from the packaging sheet structure of claim 6.

12. A retortable pouch made from a multiple layer flexible sheet structure, wherein the layers are firmly adhered to each other in face to face contact, said sheet structure comprising, in order:
    (a) a first layer of nylon;
    (b) a second layer of ethylene vinyl alcohol copolymer containing an effective amount of a plasticizer therefore;
    (c) a third layer of nylon;
    (d) a fourth layer of anhydride modified polyolefin; and
    (e) a fifth layer of a heat sealable olefinic polymer;
said film having been made by coextruding said first, second, third, fourth and fifth layers to form a five layer film, and subsequently molecularly orienting said five layer film, such that each of said five layers is molecularly oriented.

13. A retortable pouch made from a multiple layer flexible sheet structure, wherein the layers are firmly adhered to each other in face to face contact, said sheet structure comprising, in order;
    (a) a first layer of nylon;
    (b) a second layer of ethylene vinyl alcohol copolymer containing an effective amount of a plasticizer therefore;
    (c) a third layer of nylon;
    (d) a fourth layer of anhydride modified polyolefin;
    (e) a fifth layer of a heat sealable olefinic polymer;
    (f) a sixth polymeric adhesive layer; and
    (g) a seventh olefinic heat seal layer;
said film having been formed by:
    (1) coextruding said first, second, third, fourth and fifth layers to form a five layer film;
    (2) molecularly orienting said five layer film, such that each of said five layers is molecularly oriented;
    (3) forming said seventh olefinic layer; and
    (4) adhering said seventh layer to said fifth layer by means of said sixth adhesive layer.

14. A retortable pouch made from a multiple layer flexible sheet structure, wherein the layers are firmly adhered to each other in face to face contact, said sheet structure comprising, in order;
    (a) a first layer of nylon;
    (b) a second layer of ethylene vinyl alcohol copolymer containing an effective amount of a plasticizer therefore;
    (c) a third layer of nylon;
    (d) a fourth layer of anhydride modified polyolefin; and
    (e) a fifth layer of a heat sealable olefinic polymer;
said film having been formed by:
    (1) coextruding said first, second, and third layers to form a three layer film;

(2) molecularly orienting said three layer film, such that each of said three layers is molecularly oriented;
(3) extruding said fifth olefinic layer; and
(4) adhering said fifth layer to said third layer by means of said fourth adhesive layer.

15. A retortable pouch made from a multiple layer flexible sheet structure, wherein the layers are firmly adhered to each other in face to face contact, said sheet structure comprising, in order;
  (a) a first layer of nylon;
  (b) a second layer of ethylene vinyl alcohol copolymer containing an effective amount of a plasticizer therefore;
  (c) a third layer of nylon;
  (d) a fourth layer of an anhydride modified polyolefin;
  (e) a fifth layer of a heat sealable olefinic polymer;
  (f) a sixth polymeric adhesive layer; and
  (g) a seventh olefinic heat seal layer;
said film having been formed by;
  (1) coextruding said first, second, and third layers to form a three layer film;
  (2) molecularly orienting said three layer film, such that each of said three layers is molecularly oriented;
  (3) forming said fifth, sixth and seventh layers and adhering them together with good adhesion; and
  (4) adhering said fifth layer to said third layer by means of said fourth layer.

* * * * *